(12) United States Patent
Rogers et al.

(10) Patent No.: US 7,640,840 B2
(45) Date of Patent: Jan. 5, 2010

(54) AUTOMATED LAUNCH MATING SYSTEM

(75) Inventors: Thorin A. Rogers, Long Beach, CA (US); Robert J. Atmur, Whither, CA (US); Ron A. Kubinski, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 12/013,285

(22) Filed: Jan. 11, 2008

(65) Prior Publication Data

US 2009/0217808 A1 Sep. 3, 2009

(51) Int. Cl.
*F41F 3/055* (2006.01)
(52) U.S. Cl. ...................................... 89/1.811
(58) Field of Classification Search ............... 89/1.8, 89/1.806, 1.807, 1.811
See application file for complete search history.

(56) References Cited

U.S. PATENT DOCUMENTS

| 2,836,105 | A | * | 5/1958 | Doak, Jr. et al. | 89/1.807 |
|---|---|---|---|---|---|
| 2,938,431 | A | * | 5/1960 | Dixon | 89/1.807 |
| 2,940,362 | A | * | 6/1960 | Paxton | 89/1.806 |
| 2,951,421 | A | * | 9/1960 | Katzen | 89/1.811 |
| 3,024,703 | A | * | 3/1962 | Herold | 89/1.811 |
| 3,072,021 | A | * | 1/1963 | Marcon | 89/1.811 |
| 3,120,784 | A | * | 2/1964 | Magers et al. | 89/1.811 |
| 3,135,161 | A | * | 6/1964 | Oyhus | 89/1.818 |
| 3,136,842 | A | * | 6/1964 | Perkins et al. | 174/88 R |
| 3,183,468 | A | * | 5/1965 | Hennessey, Jr. | 439/157 |
| 3,224,335 | A | * | 12/1965 | Witherspoon et al. | 89/1.811 |
| 3,245,319 | A | * | 4/1966 | Kossan et al. | 89/1.811 |
| 3,249,012 | A | * | 5/1966 | Clickner, Jr. | 89/1.811 |
| 4,508,404 | A | | 4/1985 | Frawley | |
| 4,976,399 | A | | 12/1990 | Bay | |
| 6,223,675 | B1 | | 5/2001 | Watt | |

* cited by examiner

*Primary Examiner*—Bret Hayes
(74) *Attorney, Agent, or Firm*—Rozenblat IP LLC

(57) ABSTRACT

In one embodiment, an automated system for mating a launch device to a launch platform may include a launch platform having a first electrical connector, and a interface member attached to the launch device. The interface member may include a second electrical connector configured to automatically couple to the first electrical connector of the launch platform.

21 Claims, 15 Drawing Sheets

AUTOMATED LAUNCH MATING SYSTEM

BACKGROUND

Launch devices, such as missiles, need to be mated to launch platforms. Some of the existing solutions are non-automated and require human operators at the launch site, utilize in-ground and/or silo launches in launch tubes, and/or utilize missiles stacked in stages on the launch platform. However, non-automated solutions requiring human operation may reduce speed of deployment and increase safety issues. In-ground and silo launches may lead to political issues because they may be confused with nuclear strikes. Missiles which are stacked in stages on the launch platform may require increased cost and/or time.

An automated system and/or method for mating a launch device to a launch platform is needed to decrease one or more problems associated with one or more of the existing systems and/or methods.

SUMMARY

In one aspect of the disclosure, an automated system for mating a launch device to a launch platform may comprise the following: a launch platform comprising a first electrical connector; and a interface member attached to a launch device which is configured to be launched from the launch platform. The interface member may comprise a second electrical connector configured to couple to the first electrical connector of the launch platform.

In another aspect of the disclosure, a method for automatically mating a launch device to a launch platform is disclosed. In one step, a launch platform may be provided comprising a first electrical connector. In another step, a launch device may be provided comprising a interface member. The interface member may comprise a second electrical connector. In still another step, the second electrical connector of the interface member may be automatically coupled to the first electrical connector of the launch platform.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
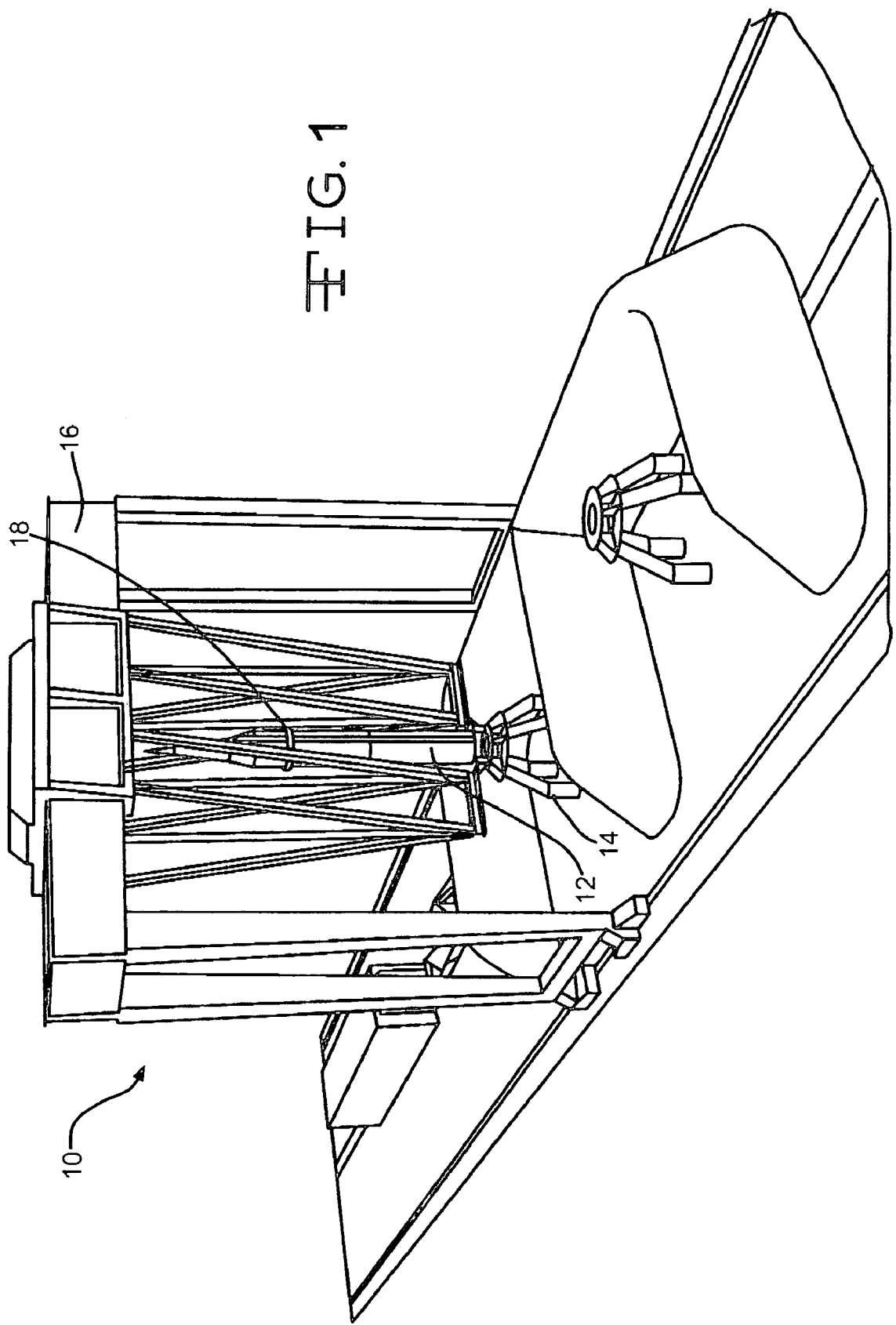
FIG. 1 shows a perspective view of an automated system for mating a launch device to a launch platform.

FIG. 1 shows a perspective view of an automated system 10 for mating a launch device 12 to a launch platform 14. The automated system 10 may include the launch device 12, the launch platform 14, and a crane 16 for transporting and lowering the launch device 12 onto the launch platform 14. The crane 16 may have a vertical lift device 18 attached to the launch device 12 for lifting and lowering the launch device 12 onto the launch platform 14. The launch platform 14 may be configured to support the launch device 12 during launching of the launch device 12.

Figure 2:
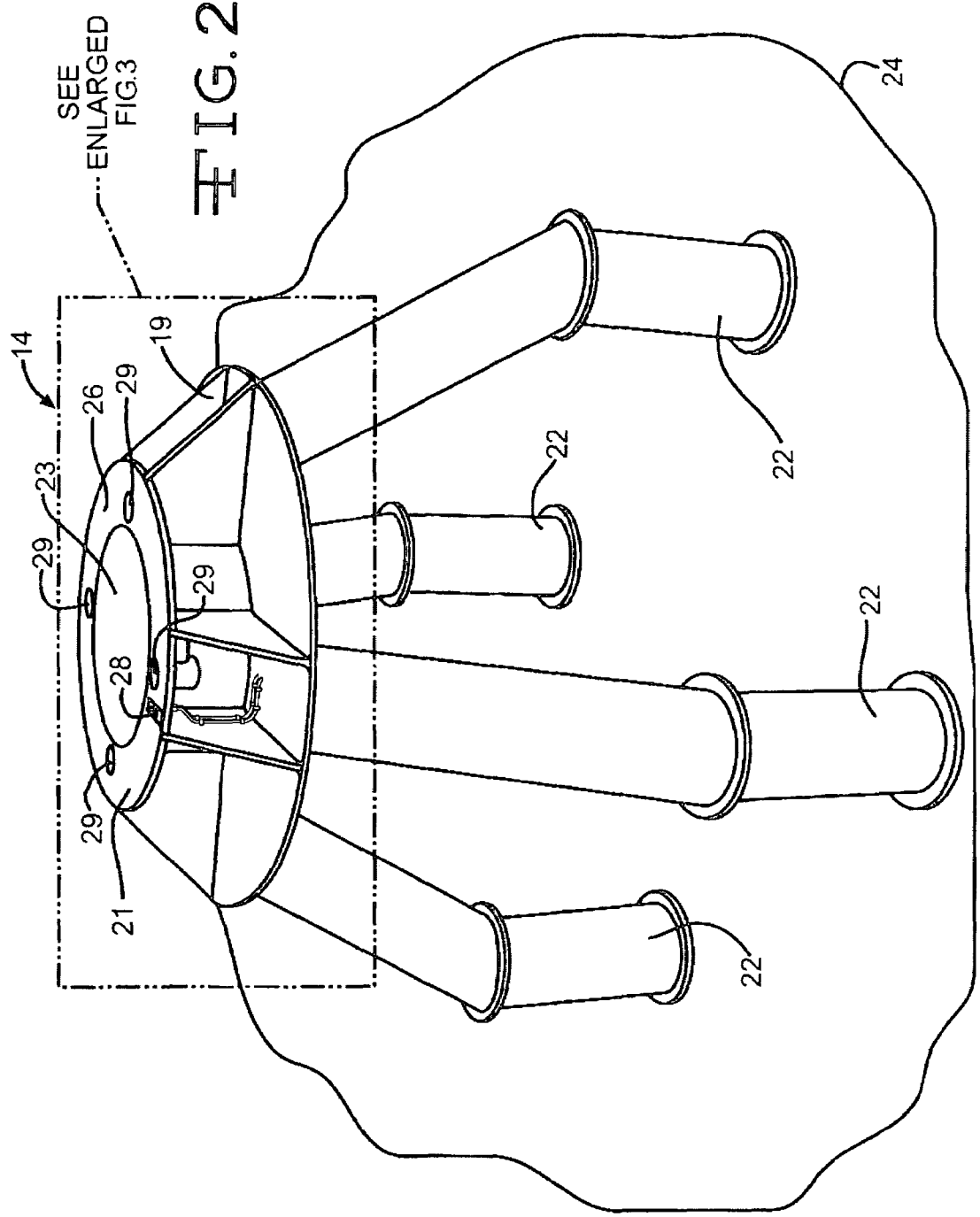
FIG. 2 shows a perspective view of the launch platform of FIG. 1.

FIG. 2 shows a perspective view of the launch platform 14 of FIG. 1. The launch platform 14 may comprise a stool shape 19 having a cylindrical base 21 which the launch device 12 may sit on, and a plurality of legs 22, which may stand on a ground surface 24. The cylindrical base 21 may be defined by a circular hole 23. In other embodiments, the launch platform 14 maybe in varying shapes, sizes, and/or configurations.

Figure 3:
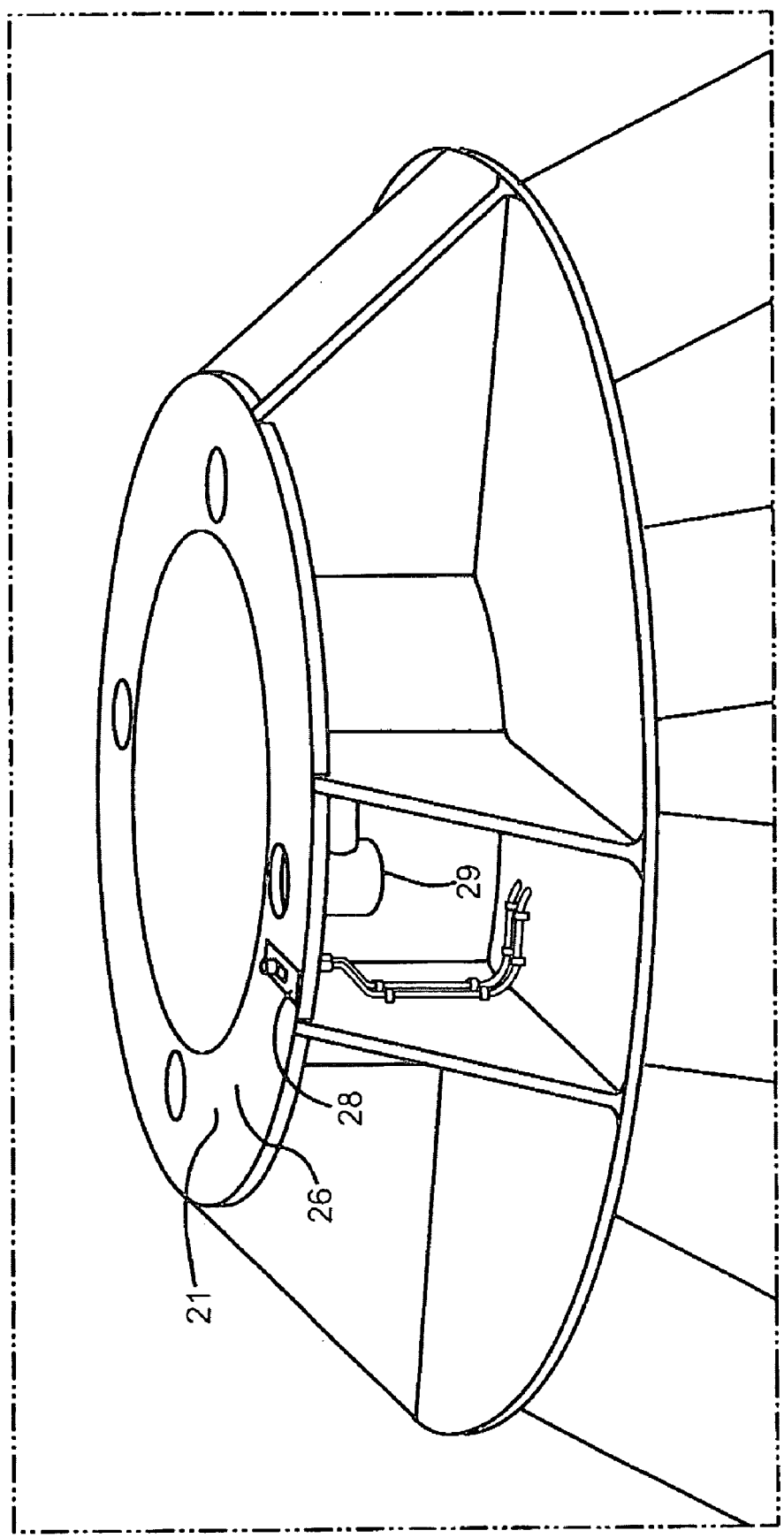
FIG. 3 shows an enlarged view within rectangle 3-3 of FIG. 2.

FIG. 3 shows an enlarged view within rectangle 3-3 of FIG. 2. As shown, a perimeter, cylindrical surface 26 of the base 21 may contain an auto umbilical assembly 28 built into the surface 26. As shown in FIGS. 2 and 3, a plurality of mating structures 29 may also be built into the surface 26.

Figure 4:
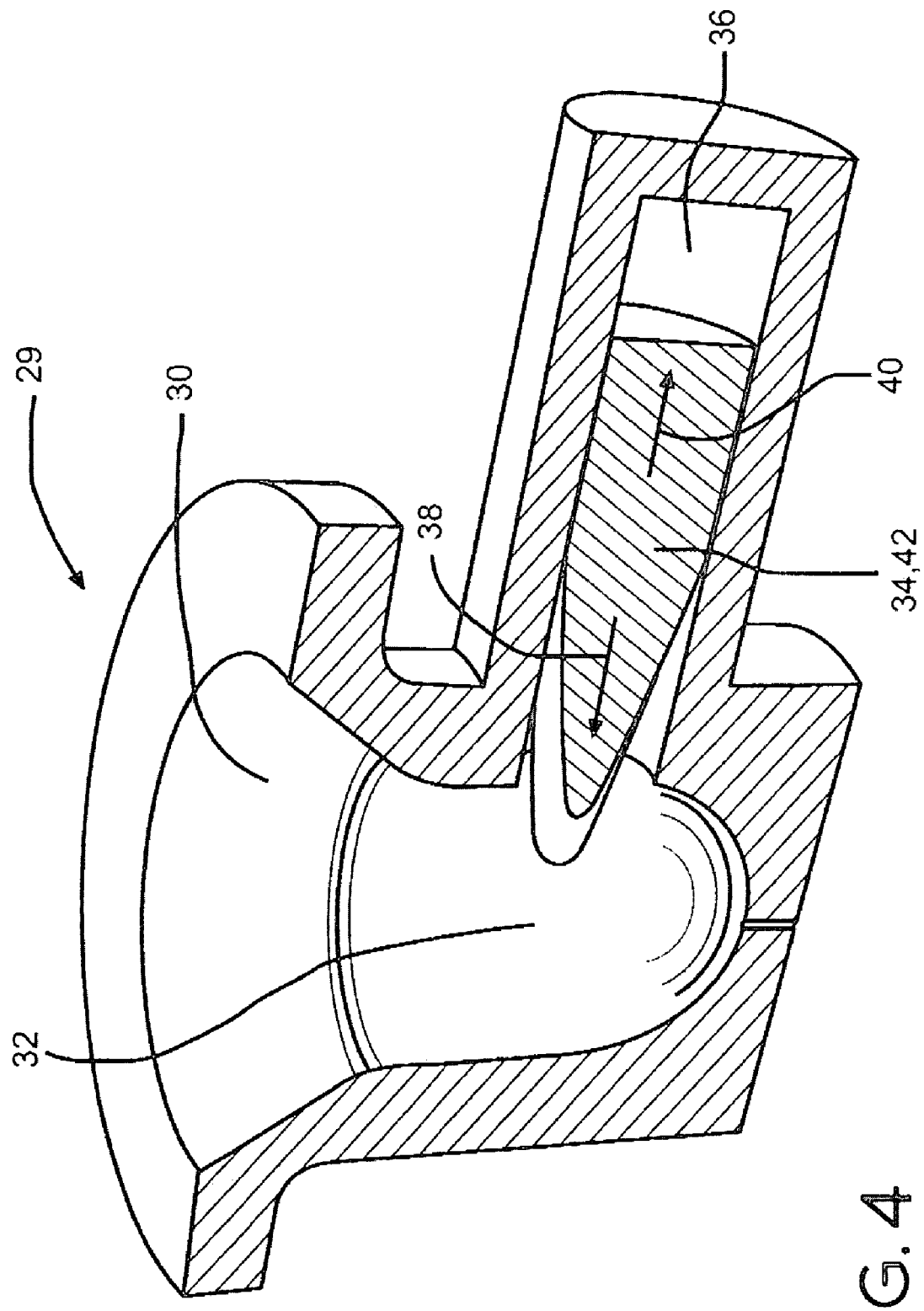
FIG. 4 shows a cross-section view of a mating structure of FIG. 3 separated from the surface of the launch platform.

FIG. 4 shows a cross-section view of the mating structure 29 of FIG. 3 separated from the surface 26. The mating structure 29 may comprise a female mating structure 30 defined by a hole 32. In other embodiments, the mating structure 29 may comprise a male mating structure in the form of a pin member. A locking member 34 may be adapted to extend into the hole 32 from an interior compartment 36 along direction 38, and to retract from the hole 32 back into the interior compartment 36 along direction 40. The locking member 34 may comprise a hydraulically actuated pin member 42. In other embodiment, the locking member 34 may vary.

Figure 5:
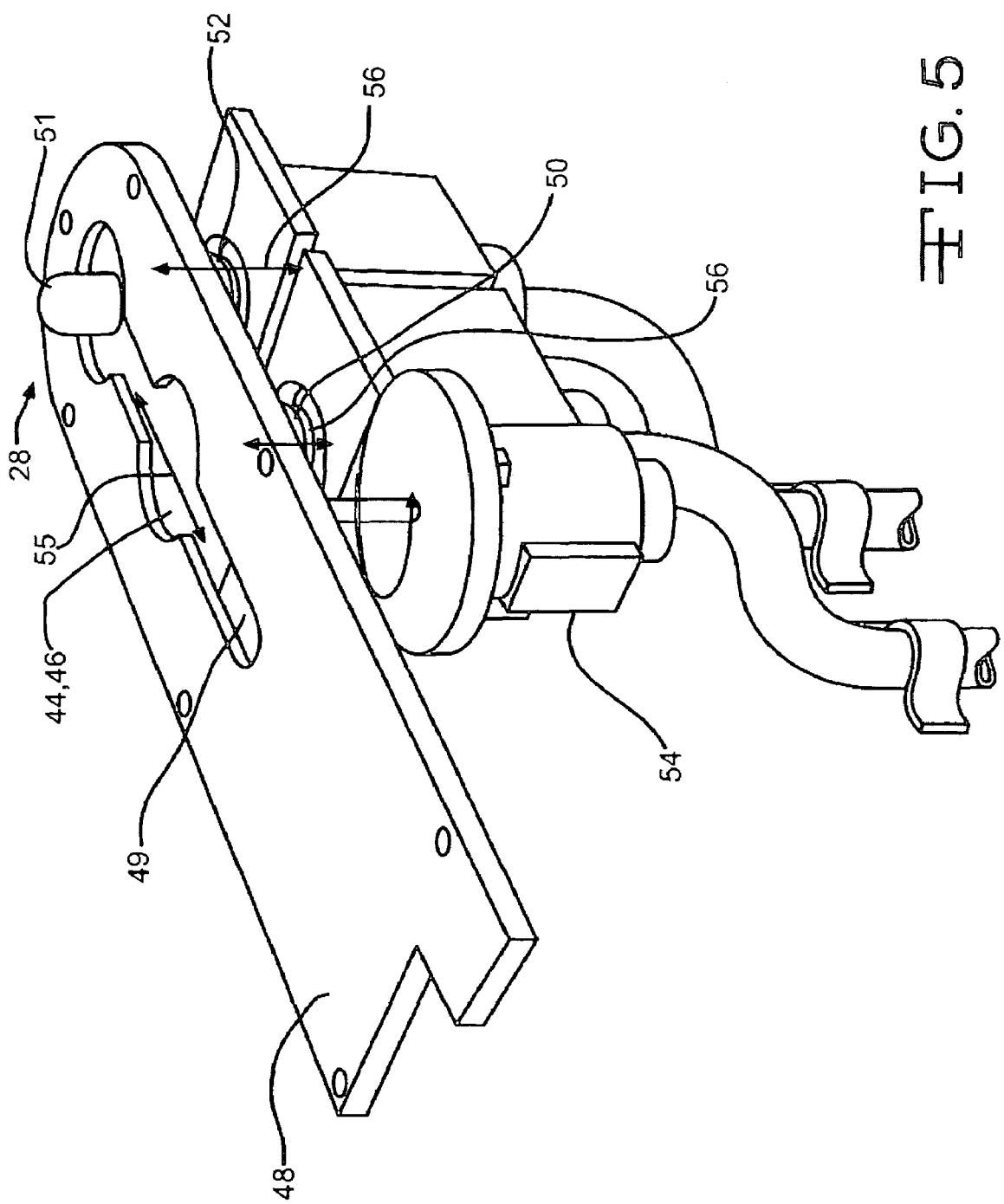
FIG. 5 shows an enlarged view of an auto umbilical assembly of FIG. 3 separated from the surface of the launch platform with a moveable door in a closed position.

FIG. 5 shows an enlarged view of the auto umbilical assembly 28 of FIG. 3 separated from the surface 26 with a moveable door 44 in a closed position 46. The auto umbilical assembly 28 may comprise surface member 48 defined by slot 49, moveable door 44 having mating member 51 protruding out of slot 49, auto umbilical electrical connectors 50 and 52, and motor 54. The motor 54 may be adapted to move the door 44 back and forth along direction 55 to open and close the door 44 within the slot 49. When the door 44 is open, the electrical connectors 50 and 52 may be uncovered. When the door 44 is closed, the electrical connectors 50 and 52 may be covered. The motor 54 may also be adapted to move the electrical connectors 50 and 52 along direction 56 to extend and retract the electrical connectors 50 and 52.

Figure 6:
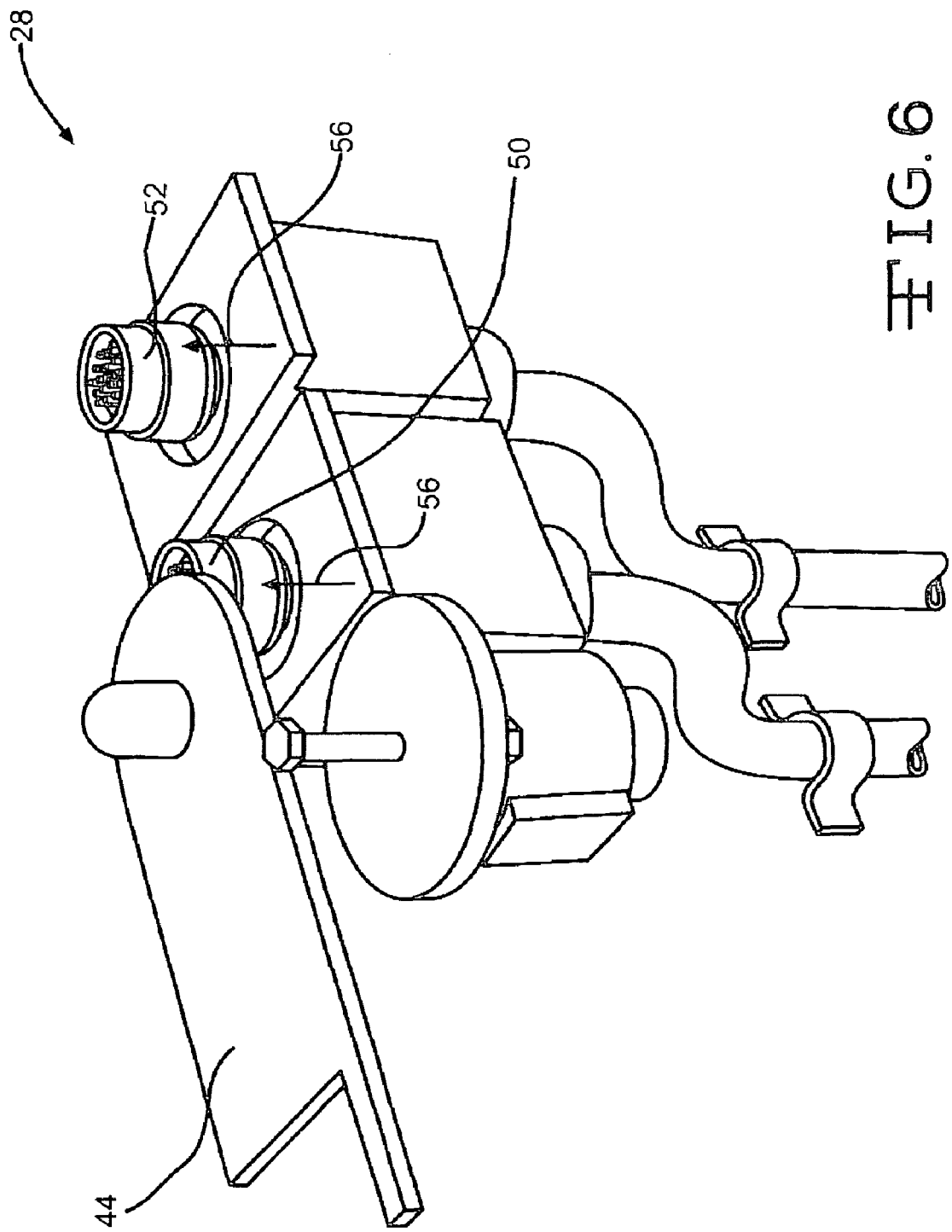
FIG. 6 shows an enlarged view of the auto umbilical assembly of FIG. 5 with the moveable door in an open position and electrical connectors extended upwardly out of a slot.

FIG. 6 shows an enlarged view of the auto umbilical assembly 28 of FIG. 5 with the moveable door 44 in an open position 57 and the electrical connectors 50 and 52 extended upwardly along direction 56 out of the slot 49 of surface member 48. In this position the electrical connectors 50 and 52 are accessible. In other embodiments, a varying number, type, size, and/or configuration of electrical connectors 50 and 52 may be utilized.

Figure 7:
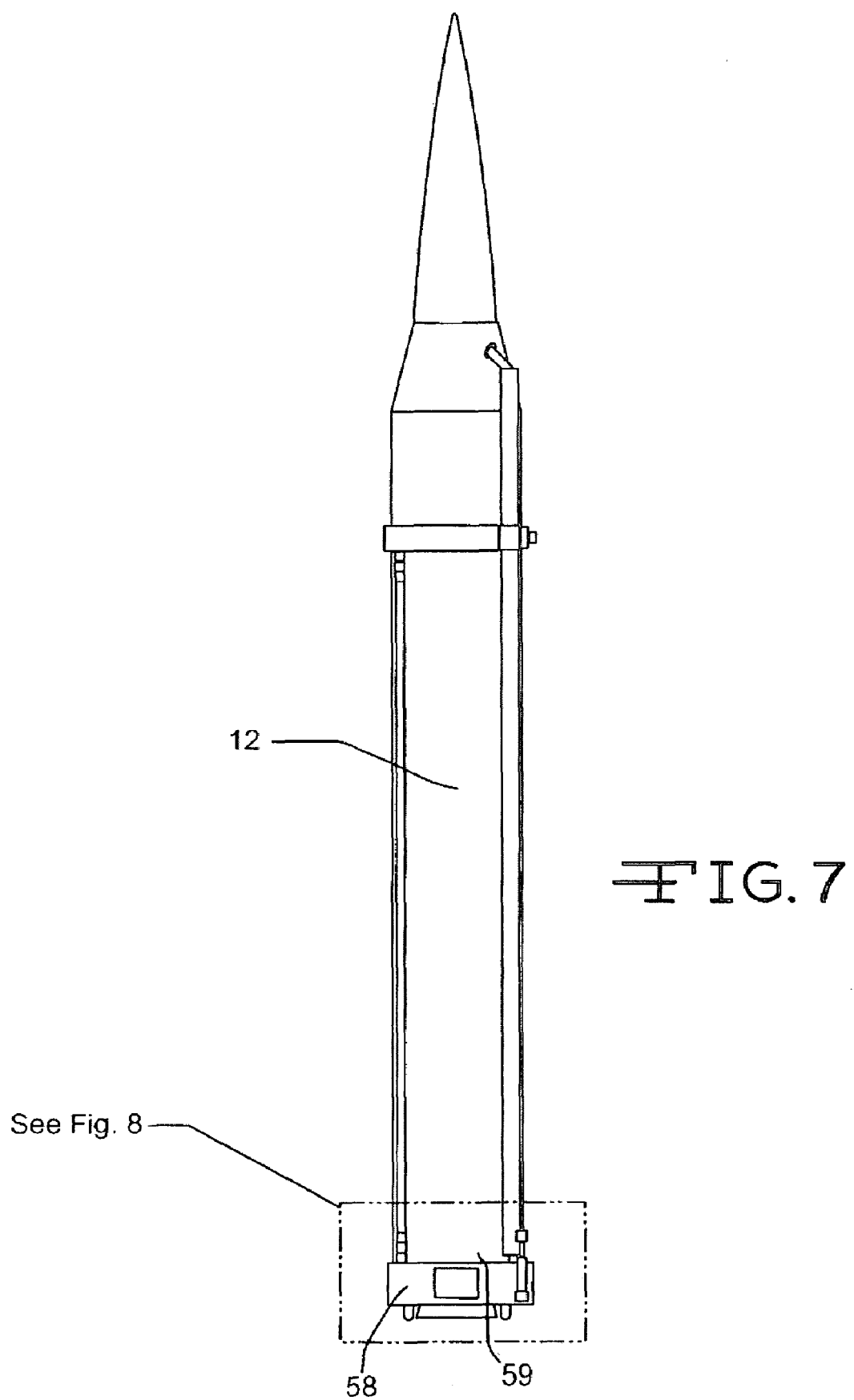
FIG. 7 shows a perspective view of the launch device of FIG. 1.

FIG. 7 shows a perspective view of the launch device 12 of FIG. 1. The launch device 12 may comprise one of a missile, an aircraft, a spacecraft, or another type of device. The launch device 12 may be adapted to be moved and connected to the launch platform 14 in a ready-to-launch state. A substantially cylindrical interface member 58 may be attached to an aft end 59 of the launch device 12. The interface member 58 may comprise a trunnion. In other embodiments, the interface member 58 may be in varying shapes, sizes, and/or configurations.

Figure 8:
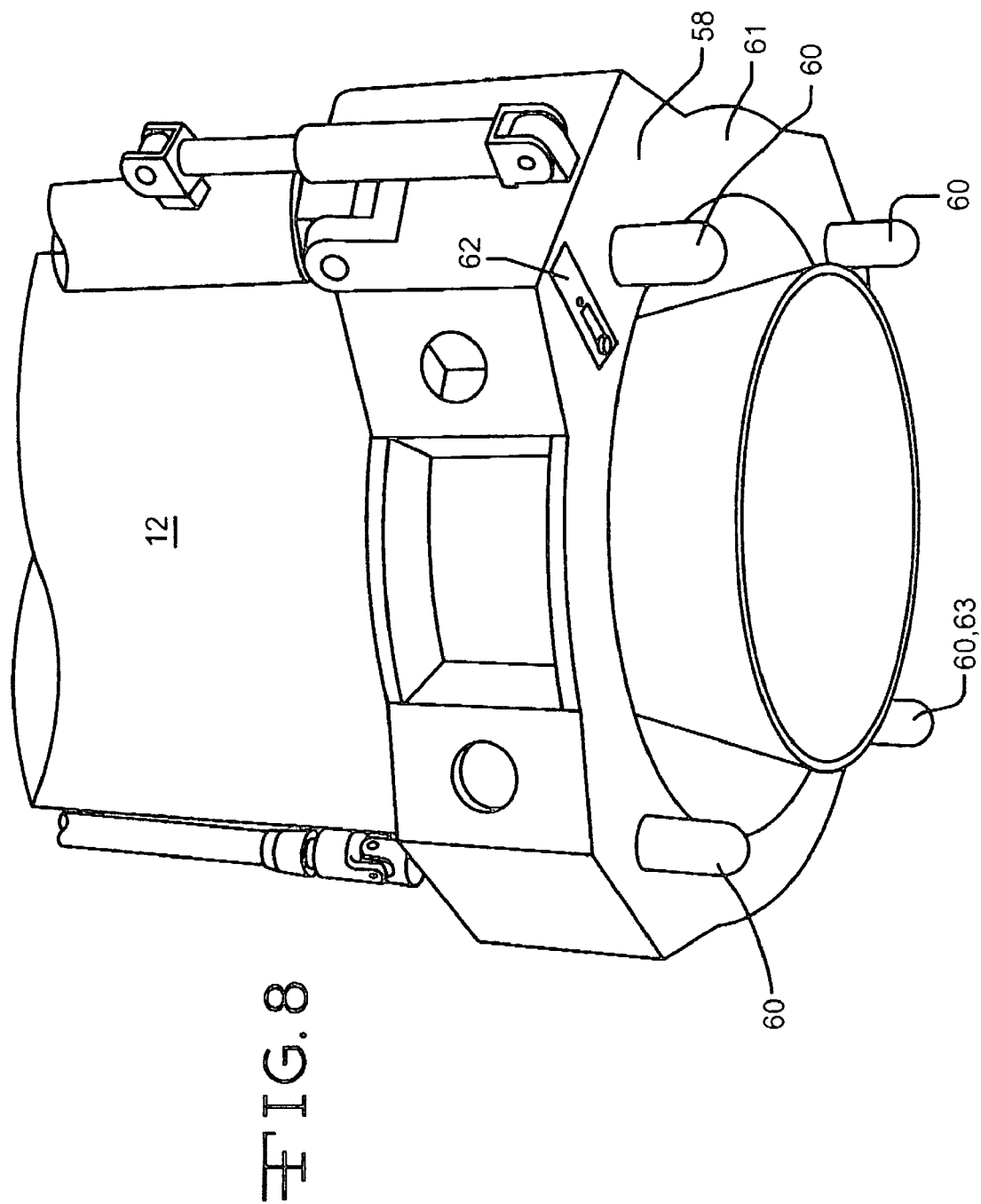
FIG. 8 shows an enlarged view within rectangle 8-8 of FIG. 7.

FIG. 8 shows an enlarged view within rectangle 8-8 of FIG. 7. As shown, the interface member 58 may comprise a plurality of mating structures 60 extending from a bottom surface 61 of the interface member 58, and an auto umbilical assembly 62 built into the bottom surface 61. The mating structures 60 may comprise male pin mating members 63. In other embodiments, the mating structures 60 may comprise female mating structures, such as mating holes.

Figure 9:
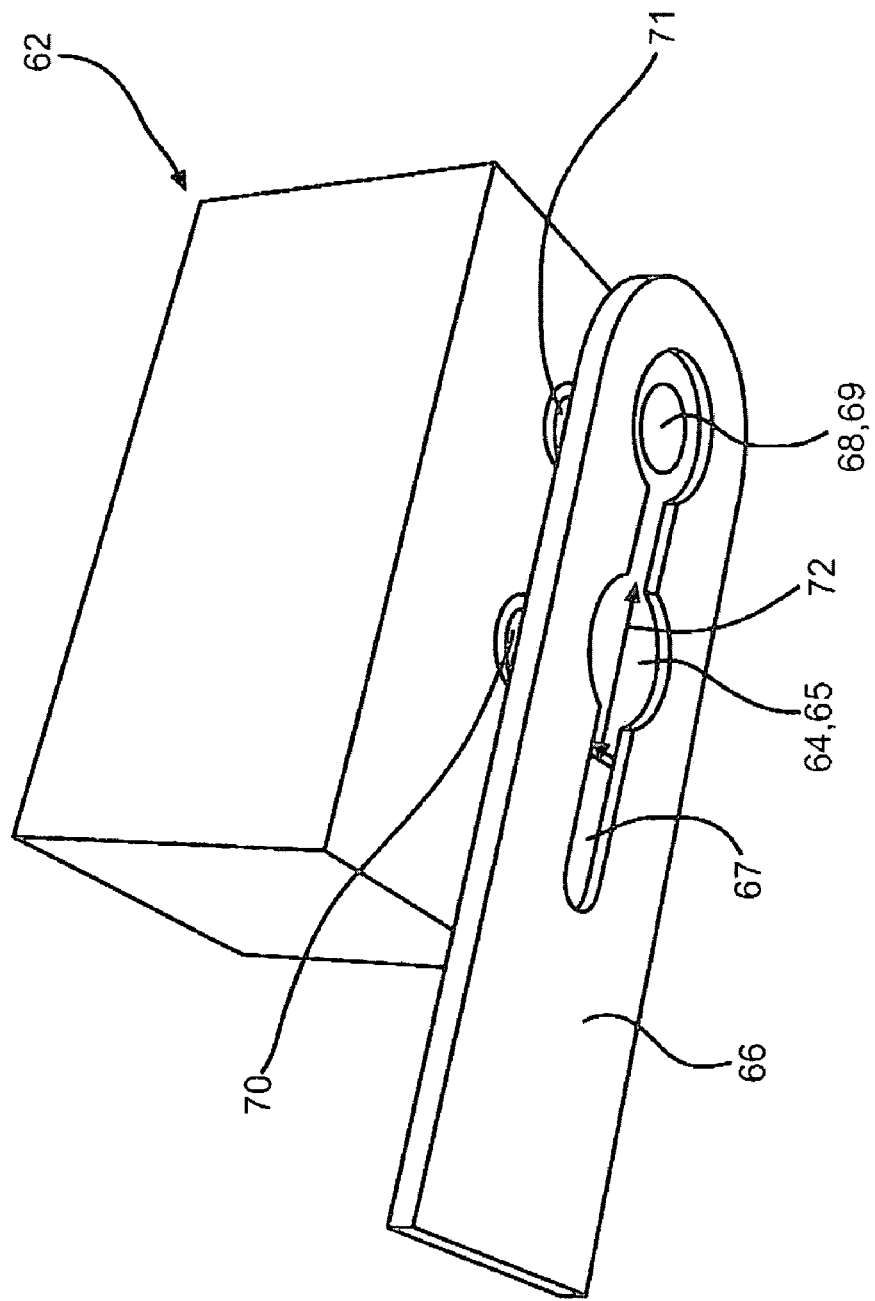
FIG. 9 shows an enlarged perspective view of an auto umbilical assembly of FIG. 8 separated from a bottom surface of a interface member of the launch device with a moveable door in a closed position.

FIG. 9 shows an enlarged perspective view of the auto umbilical assembly 62 of FIG. 8 separated from the bottom surface 61 of the interface member 58 with a moveable door 64 in a closed position 65. The auto umbilical assembly 62 may comprise surface member 66 defined by slot 67, moveable door 64 defined by a mating member 68 in the form of a female pocket 69, and auto umbilical electrical connectors 70 and 71. The door 64 may be adapted to move back and forth along direction 72 to open and close the door 64 within the slot 67. When the door 64 is open, the electrical connectors 70 and 71 may be uncovered. When the door 64 is closed, the electrical connectors 70 and 71 may be covered. The electrical connectors 70 and 71 may be fixed in place.

Figure 10:
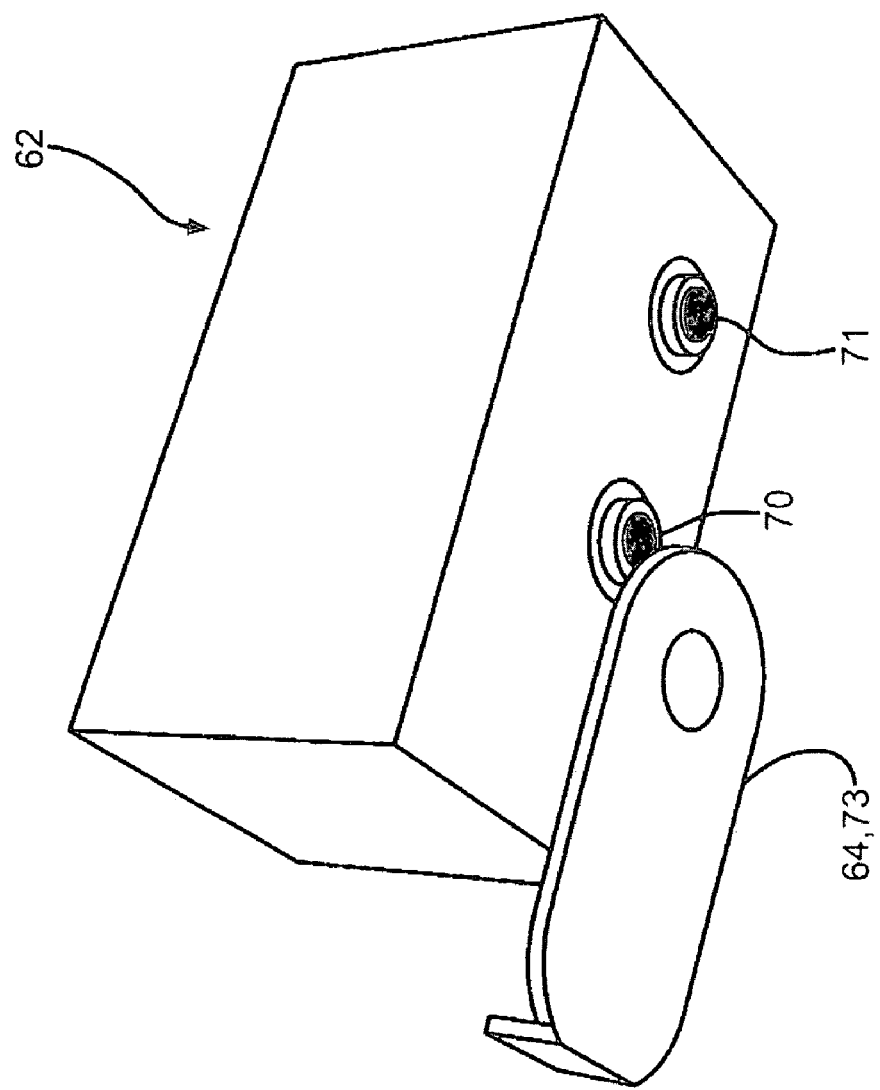
FIG. 10 shows an enlarged view of the auto umbilical assembly of FIG. 9 with the moveable door in an open position and auto umbilical electrical connectors uncovered and accessible.

FIG. 10 shows an enlarged view of the auto umbilical assembly 62 of FIG. 9 with the moveable door 64 in an open position 73 and the auto umbilical electrical connectors 70 and 71 uncovered and accessible. In other embodiments, a varying number, type, size, and/or configuration of electrical connectors 70 and 71 may be utilized.

Figure 11:
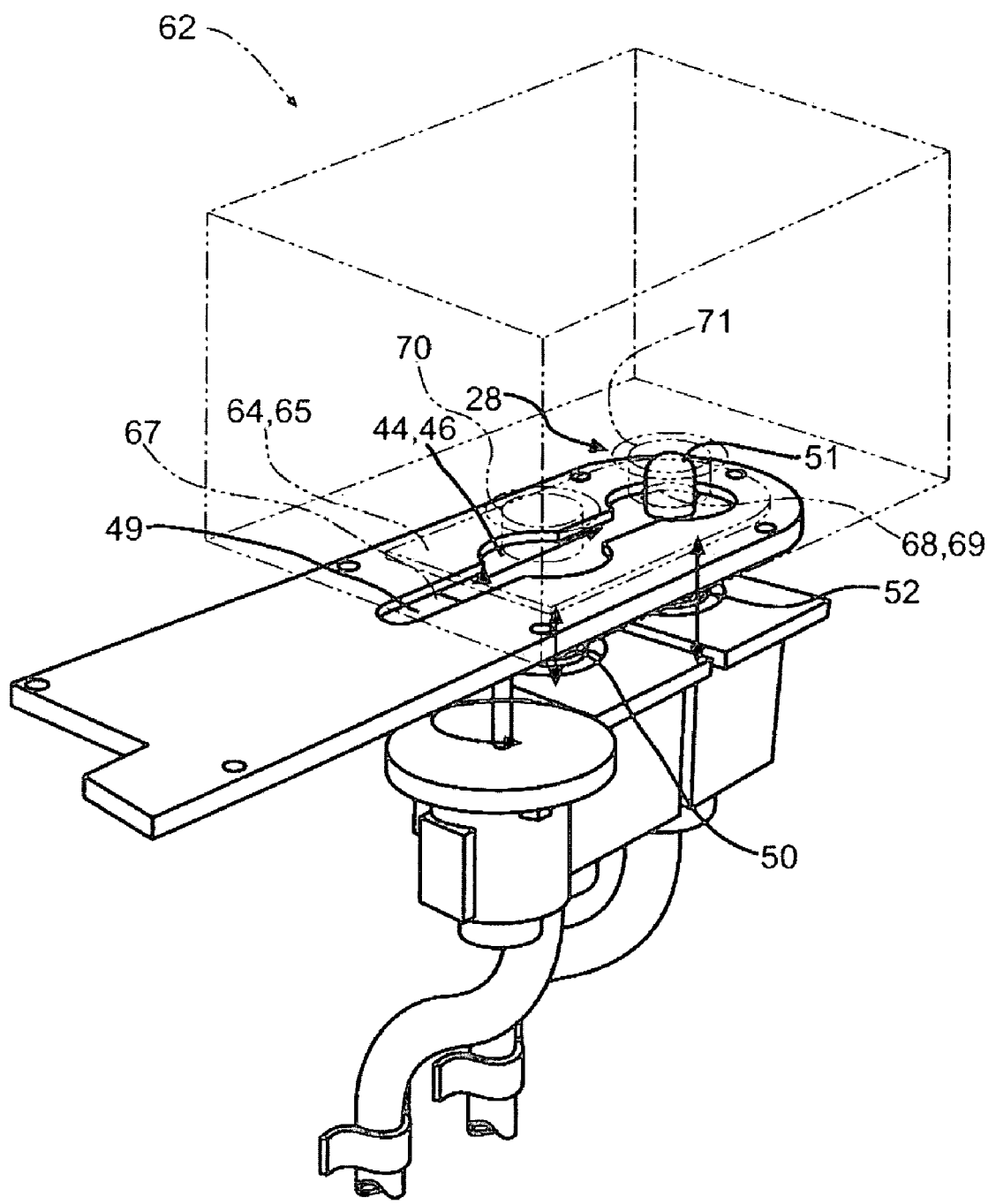
FIG. 11 shows a perspective view of the launch device auto umbilical assembly of FIG. 9 disposed against the launch platform auto umbilical assembly of FIG. 5.

FIG. 11 shows a perspective view of the launch device auto umbilical assembly 62 of FIG. 9 disposed against the launch platform auto umbilical assembly 28 of FIG. 5. The launch device 12, interface member 58, and launch platform 14 are not shown for clarity. Both the door 44 of the launch platform 14 and the door 64 of the launch device 12 may be closed and may cover their respective slots 49 and 67 and respective electrical connectors 50, 52, 70, and 71. The mating member 51 of moveable door 44 may protrude out of slot 49 into pocket 69 of door 64. Electrical connectors 50 and 52 of the launch platform 14 may be in their retracted position below slot 49. In other embodiments, the mating member 51 of moveable door 44 may comprise a female mating member such as a pocket or a hole, and the mating member 68 of door 64 may comprise a corresponding male mating member such as a pin member. In still other embodiments, the mating member 51 and/or the mating member 68 may vary in type, size, orientation, and/or configuration.

Figure 12:
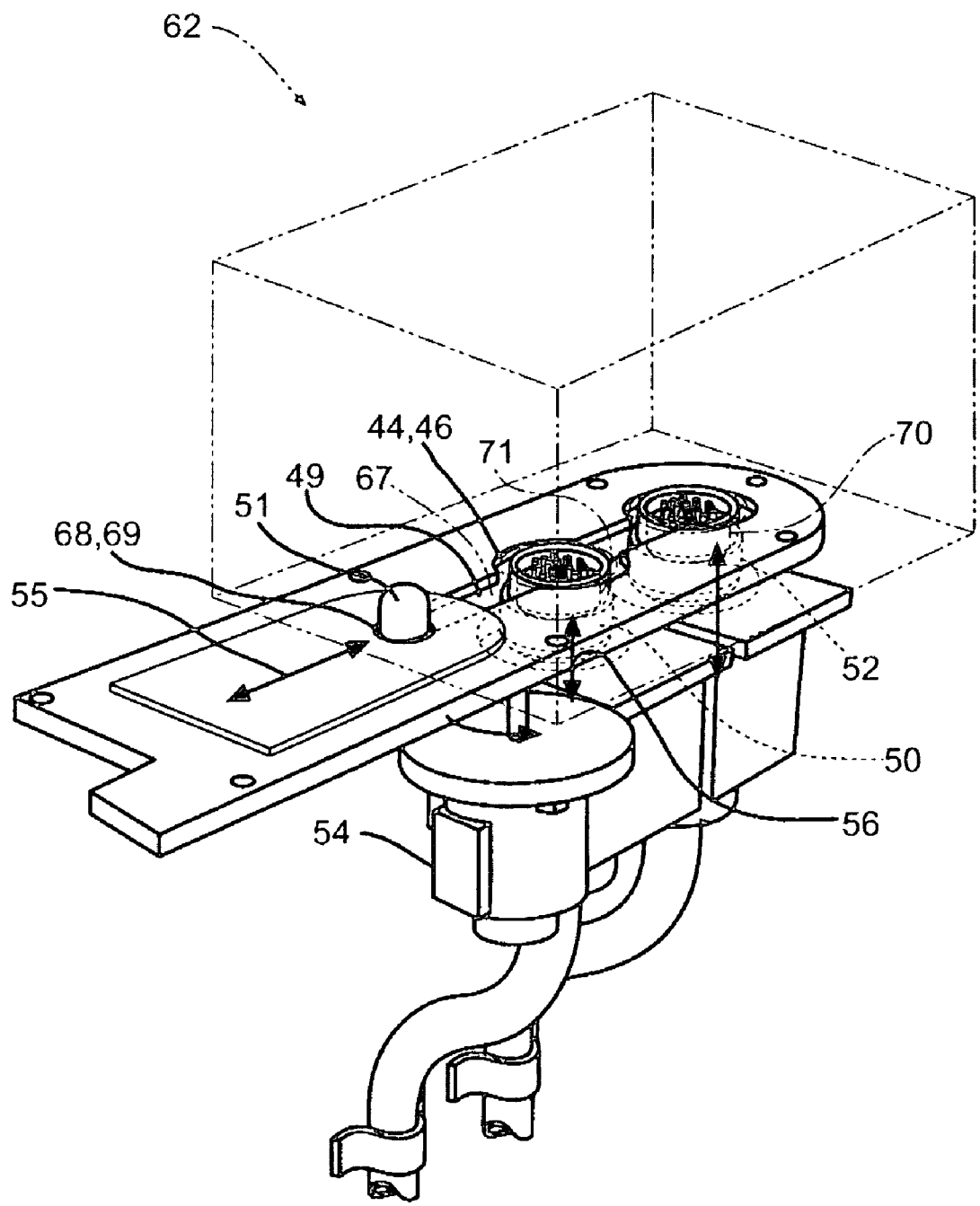
FIG. 12 shows a perspective view of FIG. 11 with doors of the launch platform and launch device in open positions, and electrical connectors of the launch platform extended out of a slot and connected to electrical connectors of the launch device.

FIG. 12 shows a perspective view of FIG. 11 with the door 44 of the launch platform 14 and the door 64 of the launch device 12 both in open positions, and the electrical connectors 50 and 52 of the launch platform 14 extended along direction 56 out of slot 49 and connected to the electrical connectors 70 and 71 of the launch device 12. To gel into this position, the motor 54 may have moved the door 44 along direction 55 to uncover the slot 49. When the door 44 moved into its open position, the mating member 51 of door 44 extending into pocket 69 of door 64 may have forced door 64 to also move into its open position. The motor 54 may then have extended the electrical connectors 50 and 52 of the launch platform 14 along direction 56 out of slot 49 through slot 67 in order to automatically connect to electrical connectors 70 and 71. The connected electrical connectors 50, 52, 70, and 71 may then send electrical signals between the connectors in order to automatically launch the launch device 12 from launch platform 14 without a human operation at the launch site. The connected electrical connectors 50, 52, 70, and 71 may also exchange power and/or communication signals.

The motor 54 may subsequently retract the electrical connectors 50 and 52 of the launch platform back 14 into their position of FIG. 11 to disconnect the electrical connectors 50. 52, 70, and 71. The motor 54 may also close door 44 forcing door 64 to close to put doors 44 and 64 back into their closed positions of FIG. 11. In other embodiments, the electrical connectors 70 and 71 may be moveable and/or the electrical connectors 50 and 52 may be fixed in place.

Figure 13:
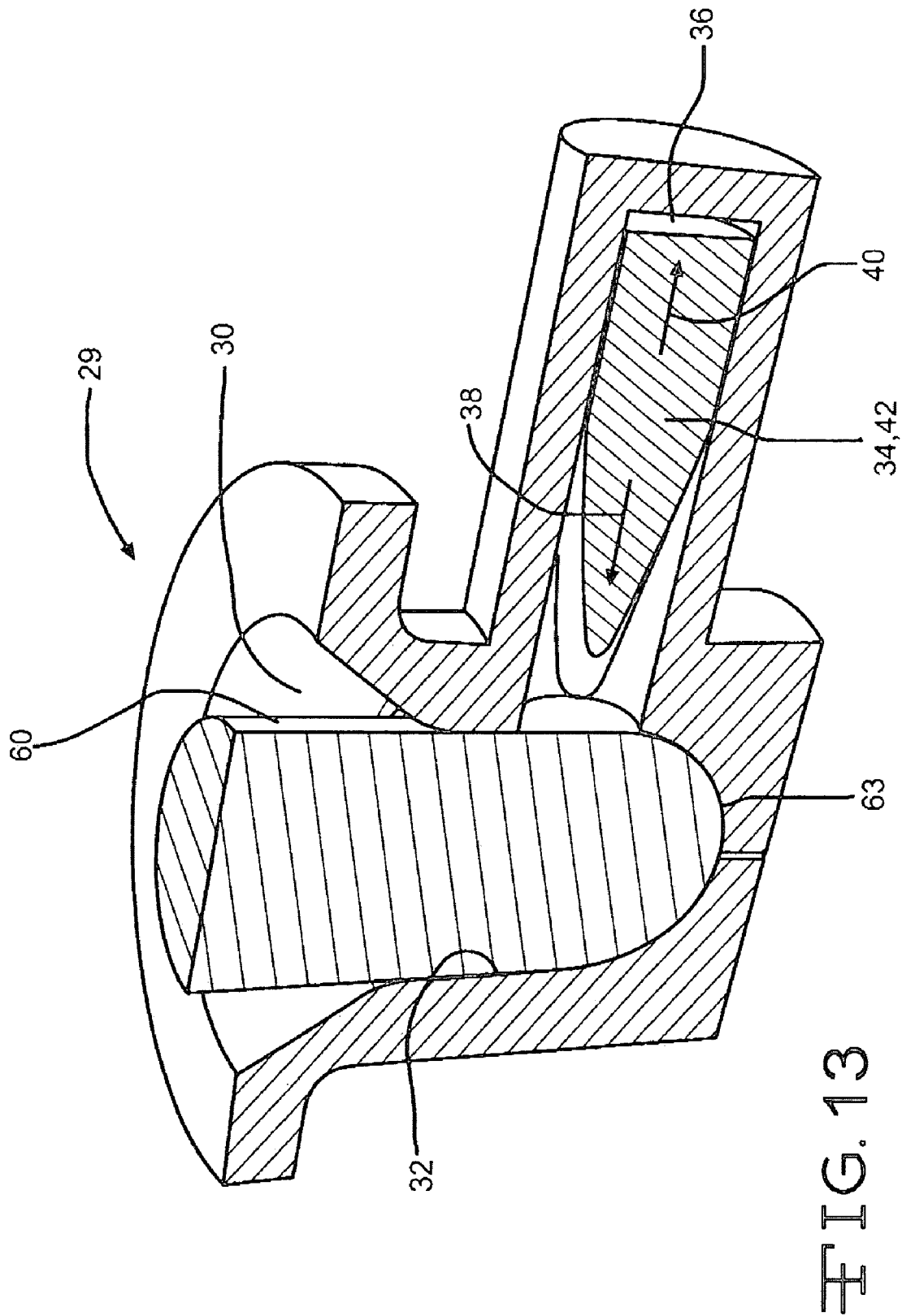
FIG. 13 shows a perspective view of one launch device mating structure of FIG. 8 disposed against and within a launch platform mating structure of FIG. 4.

FIG. 13 shows a perspective view of one of the launch device mating structures 60 of FIG. 8 disposed against and within one of the launch platform mating structures 29 of FIG. 4. The launch device 12, interface member 58, and launch platform 14 are not shown for clarity. The launch device mating structure 60, which may comprise a male pin mating member 63, is disposed within the launch platform mating structure 29, which may comprises a female mating structure 30 comprising a hole 32. The locking member 34 may be retracted within the interior compartment 36 and may not be in contact with the launch device mating structure 60. In such manner, the launch device mating structure 60 may not be locked to the female mating structure 30.

Figure 14:
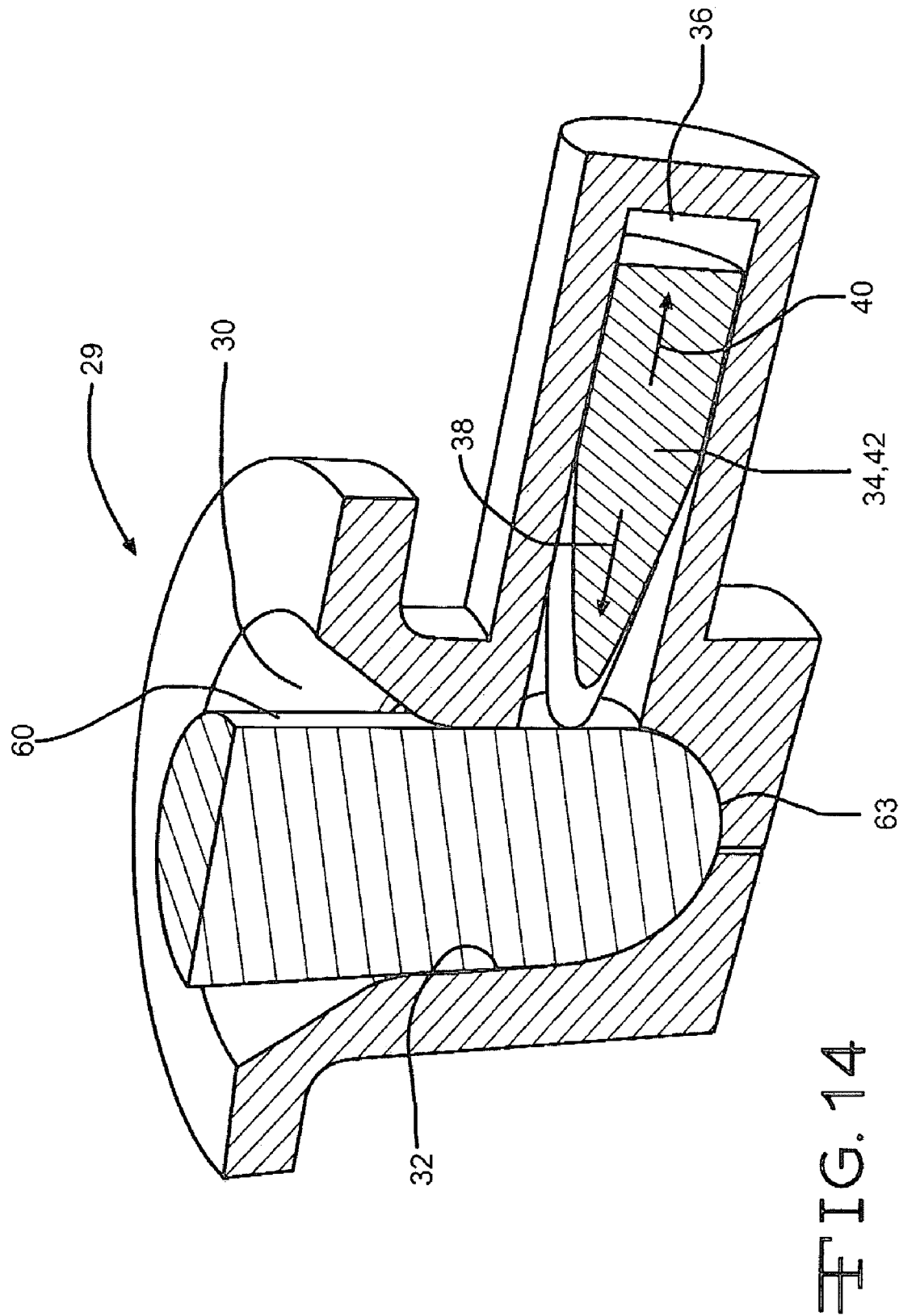
FIG. 14 shows a perspective view of FIG. 13 with a launch platform locking member extended out of an interior compartment of a mating structure against a launch device mating structure.

FIG. 14 shows a perspective view of FIG. 13 with the locking member 34 extended out of the interior compartment 36 of the mating structure 29, along direction 38, against the launch device mating structure 60. In this such manner, the locking member 34 may abut against the launch device mating structure 60 and lock it in place within the mating structure 29. This may lock the launch device 12 to the launch platform 14. In other embodiments, the launch device mating structure 60 of the interface member 58 may comprise a female mating structure, and the launch platform mating structure 29 may comprise a corresponding male mating structure. In still other embodiments, the launch device mating structure 60 and the launch platform mating structure 29 may vary in type, size, orientation, and/or configuration. The locking member 34 may subsequently retract in direction 40 to unlock the launch device mating structure 60 from the mating structure 29.

Figure 15:
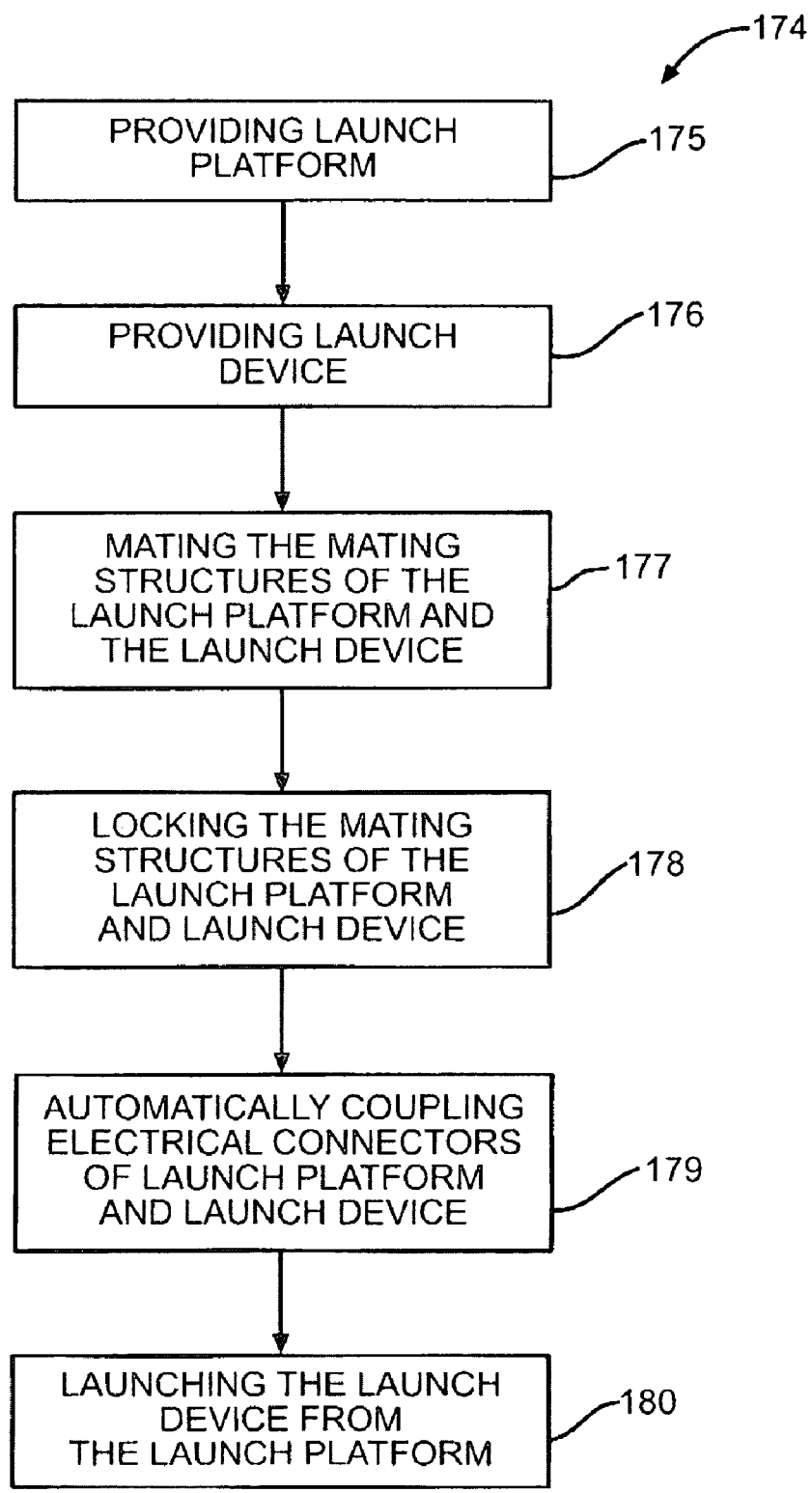
FIG. 15 shows a flowchart of one embodiment of a method for automatically mating a launch device to a launch platform.

FIG. 15 shows a flowchart of one embodiment of a method 174 for automatically mating a launch device 12 to a launch platform 14. The launch device 12 and/or the launch platform 14 may comprise any of the embodiments disclosed herein. In one step 175, the launch platform 14 may be provided. The launch platform 14 may comprise a first electrical connector 50. In another step 176, a launch device 12 may be provided. The launch device 12 may comprises a interface member 58 comprising a second electrical connector 70.

Another step 177 may comprise mating a mating structure 29 of the launch platform 14 against a corresponding mating structure 60 of the interface member 58. The mating structures 29 and 60 may comprise interlocking female and male structures. In still another step 178, the mating structures 29 and 60 of the launch platform 14 and the launch device 12 may be locked to one another. In still another step 179, the second electrical connector 70 of the interface member 58 may be automatically coupled to the first electrical connector 50 of the launch platform 14 putting the launch device 12 into a ready-to-launch stale. The automatically coupling step 179 may further comprise moving at least one of the first and second electrical connectors 50 and 70 against the corresponding second and first electrical connector 70 and 50. The automatically coupling step 179 may additionally comprise moving at least one door 44 and/or 64 of at least one of the launch platform 14 and the interface member 58 in order to automatically couple the second electrical connector 70 to the first electrical connector 50. In an additional step 180, the launch device 12 may be launched from the launch platform 14 using an electrical signal sent between the first and second electrical connectors 50 and 70.

One or more embodiments of the disclosure may provide one or more improvements over one or more of the existing systems and/or methods. For instance, one or more embodiments of the disclosure may provide the following: an automated launching system which does not require human operators at the launch site, for safety and/or speed of deployment; a launch system which is above ground for political reasons; an automatic mating system which secures the launch device to the launch platform; an automatic electronic mating system to interface power, communications, and/or launch signals; and/or other improvements over one or more of the existing systems and/or methods.

It should be understood, of course, that the foregoing relates to exemplary embodiments of the disclosure and that modifications may be made without departing from the spirit and scope of the disclosure as set forth in the following claims.

The invention claimed is:

1. An automated system for mating a launch device to a launch platform comprising:
   a launch platform comprising a platform electrical connector and a platform moveable door having a platform mating member; and
   an interface member attached to the launch device the interface member comprising an interface electrical connector and an interface moveable door, the interface electrical connector configured to couple to the platform electrical connector, the interface moveable door having an interface mating member, the interface moveable door configured to move to cover the interface electrical connector and to move to uncover the interface electrical connector, the platform mating member configured to mate with and move the interface mating member, and the launch device configured to be launched from the launch platform.

2. The automated system of claim 1 wherein the launch platform is configured to support the launch device during launching of the launch device.

3. The automated system of claim 1 wherein the launch device is adapted to be moved and connected to the launch platform in a ready-to-launch state.

4. The automated system of claim 1 wherein the launch platform comprises a base and a plurality of legs.

5. The automated system of claim 1 wherein the platform electrical connector is configured to move to be coupled to the interface electrical connector, and is also configured to move to be uncoupled from the interface electrical connector.

6. The automated system of claim 1 wherein the launch platform comprises a plurality of platform electrical connectors.

7. The automated system of claim 1 wherein the platform moveable door is configured to move to cover the platform electrical connector and to move to uncover the platform electrical connector.

8. The automated system of claim 1 wherein the interface moveable door is configured to extend to cover the interface electrical connector, and to retract to uncover the interface electrical connector.

9. The automated system of claim 1 wherein the platform mating member and the interface mating member collectively comprise at least one female mating member and at least one male mating member.

10. The automated system of claim 1 wherein at least one of the platform mating member and the interface mating member comprises a locking member which is configured to move to lock the other of the platform mating member and the interface mating member in place, and to move to unlock the other of the platform mating member and the interface mating member.

11. The automated system of claim 10 wherein the locking member comprises a moveable pin.

12. The automated system of claim 11 wherein the interface member is substantially cylindrical.

13. The automated system of claim 1 wherein the launch device comprises at least one of a missile, an aircraft, and a spacecraft.

14. The automated system of claim 1 wherein the interface member is attached to an aft end of the launch device.

15. The automated system of claim 1 wherein the platform electrical connector and the interface electrical connector comprise auto umbilical electrical connectors.

16. The automated system of claim 1 wherein the interface member comprises a plurality of interface electrical connectors.

17. The automated system of claim 1 wherein the launch platform further comprises a crane for moving the launch device against the launch platform.

18. A method for automatically mating a launch device to a launch platform comprising:
   providing a launch platform comprising a platform electrical connector and a platform moveable door having a platform mating member;
   providing a launch device comprising an interface member, wherein the interface member comprises an interface electrical connector and an interface moveable door having an interface mating member;
   mating the platform mating member with the interface mating member;
   moving at least one of the interface mating member and the platform mating member using the other of the interface mating member and the platform mating member in order to move at least one of the interface moveable door and the platform moveable door to uncover at least one of the interface electrical connector and the platform electrical connector; and automatically coupling the interface electrical connector to the platform electrical connector.

19. The method of claim 18 wherein the automatically coupling step further comprises moving at least one of the platform electrical connector and the interface electrical connector against the other of the platform electrical connector and the interface electrical connector putting the launch device into a ready-to-launch state.

20. The method of claim 18 further comprising locking the platform mating member to the interface mating member.

21. The method of claim 18 further comprising launching the launch device from the launch platform using an electrical signal sent between the platform electrical connector and the interface electrical connector.

* * * * *